US008427139B2

(12) United States Patent
Malik et al.

(10) Patent No.: US 8,427,139 B2
(45) Date of Patent: Apr. 23, 2013

(54) DUAL POLE MAGNET STRUCTURE HAVING TWO MAGNETS 90 DEGREES OUT OF PHASE FOR POSITION SENSING IN AN ACTUATOR

(75) Inventors: Michal Malik, Frenstat pod Radhostem (CZ); Jeremy Daniel Schmidt, Chatham (CA); Titus Dovancescu, Chatham (CA)

(73) Assignee: Continental Tire Canada, Inc., Chatham, Ontario (CA)

( * ) Notice: Subject to any disclaimer, the term of this patent is extended or adjusted under 35 U.S.C. 154(b) by 1331 days.

(21) Appl. No.: 11/914,187

(22) PCT Filed: May 25, 2006

(86) PCT No.: PCT/CA2006/000852
§ 371 (c)(1),
(2), (4) Date: Jun. 9, 2008

(87) PCT Pub. No.: WO2006/125314
PCT Pub. Date: Nov. 30, 2006

(65) Prior Publication Data
US 2009/0278529 A1    Nov. 12, 2009

Related U.S. Application Data

(60) Provisional application No. 60/684,281, filed on May 25, 2005.

(51) Int. Cl.
*G01B 7/14* (2006.01)
*G01B 7/30* (2006.01)
(52) U.S. Cl.
USPC .............. 324/207.2; 324/207.21; 324/207.25; 324/303; 324/219

(58) Field of Classification Search ............... 324/207.2, 324/200, 207.25, 207.21, 207.22
See application file for complete search history.

(56) References Cited

U.S. PATENT DOCUMENTS

| | | | |
|---|---|---|---|
| 6,104,185 A * | 8/2000 | Lamm et al. | 324/207.2 |
| 6,191,415 B1 * | 2/2001 | Stridsberg | 250/231.13 |
| 6,307,365 B1 * | 10/2001 | Santos et al. | 324/207.12 |
| 6,356,076 B1 * | 3/2002 | Luetzow | 324/207.25 |
| 6,810,336 B2 * | 10/2004 | Nakane et al. | 702/43 |
| 7,298,395 B2 * | 11/2007 | Fukaya et al. | 348/149 |
| 7,362,095 B2 * | 4/2008 | Schmied | 324/207.25 |
| 7,834,618 B2 * | 11/2010 | Moura et al. | 324/207.26 |
| 2001/0048301 A1 * | 12/2001 | Schlabach et al. | 324/207.2 |
| 2002/0089324 A1 * | 7/2002 | Miyata et al. | 324/207.2 |
| 2003/0057781 A1 * | 3/2003 | Shukuri et al. | 310/68 B |
| 2003/0218458 A1 * | 11/2003 | Seger et al. | 324/303 |
| 2004/0061495 A1 * | 4/2004 | Shimomura et al. | 324/207.25 |
| 2004/0112145 A1 * | 6/2004 | May | 73/862.331 |
| 2004/0217758 A1 * | 11/2004 | Leonard | 324/207.2 |
| 2005/0134257 A1 * | 6/2005 | Etherington et al. | 324/207.2 |
| 2006/0006899 A1 * | 1/2006 | de Larminat et al. | 324/772 |
| 2006/0113988 A1 * | 6/2006 | Hall et al. | 324/207.2 |
| 2006/0170416 A1 * | 8/2006 | Sekiya | 324/207.13 |
| 2006/0244316 A1 * | 11/2006 | Kundel | 310/15 |
| 2007/0096722 A1 * | 5/2007 | Wilhelmy | 324/207.15 |
| 2007/0138889 A1 * | 6/2007 | Maldener et al. | 310/156.22 |
| 2008/0116881 A1 * | 5/2008 | May | 324/207.12 |

* cited by examiner

*Primary Examiner* — Edward Tso
*Assistant Examiner* — Alexis Boateng

(57) ABSTRACT

An increment sensor assembly includes a magnet structure having at least two dual pole magnets that are magnetized 90 degrees out of phase. The magnet structure is mounted to an output shaft rotatable about an axis of rotation. At least one Hall effect sensor is associated with each magnet to determined polarity change of the magnet structure per quadrant.

11 Claims, 1 Drawing Sheet

DUAL POLE MAGNET STRUCTURE HAVING TWO MAGNETS 90 DEGREES OUT OF PHASE FOR POSITION SENSING IN AN ACTUATOR

REFERENCE TO RELATED APPLICATIONS

The present invention claims the benefit of U.S. Provisional Patent Application No. 60/684,281, filed May 25, 2005.

BACKGROUND OF THE INVENTION

This invention relates an improved system for determining a position of a rotating output shaft for an engine actuator. More particularly, this invention relates to an incremental position sensor to measure rotation of an output shaft of an engine actuator.

Intake manifolds control airflow into a vehicle engine to modify engine performance. Engine actuators are used to control valves within the intake manifold. The valves modify air flow characteristics to enhance engine performance in terms of either fuel economy or torque output. A sensor measures the rotational position of an engine actuator output shaft to determine the position and speed of the valves. The position information is sent to an engine controller which uses the information to adjust the valves.

Currently, absolute and increment position sensors are utilized for determining engine actuator speed and position. Conventional increment position sensors include a multi-pole magnet and at least two Hall effect sensors. Each of the Hall effect sensors is arranged perpendicular to the axis of rotation of the output shaft in order to be perpendicular to the magnetic field created by the multi-pole magnet. In order to obtain accurate readings at least two Hall effect sensors that are spaced exactly 90° apart from one another are required.

However, this arrangement can provide packaging complications in confined engine spaces. It is therefore desirable to provide an improved, accurate arrangement for measuring engine actuator speed and position.

SUMMARY OF THE INVENTION

An example engine actuator according to this invention uses an incremental position sensor to measure rotation of an output shaft of a vehicle engine actuator. The example position sensor assembly of the present invention is connected to an engine actuator output shaft through a gear train. An increment sensor assembly includes a magnet structure having at least two dual pole magnets that are magnetized 90 degrees out of phase. The magnet structure is mounted to an output shaft rotatable about an axis of rotation. At least one Hall effect sensor is associated with each magnet to determined polarity change of the magnet structure per quadrant.

Because the magnets are arranged 90 degrees out of phase, the determination of polarity change per quadrant allows for increased accuracy and resolution of the position of the output shaft.

These and other features of the present invention can be best understood from the following specification and drawings, the following of which is a brief description.

DETAILED DESCRIPTION OF THE PREFERRED EMBODIMENT

Figure 1:
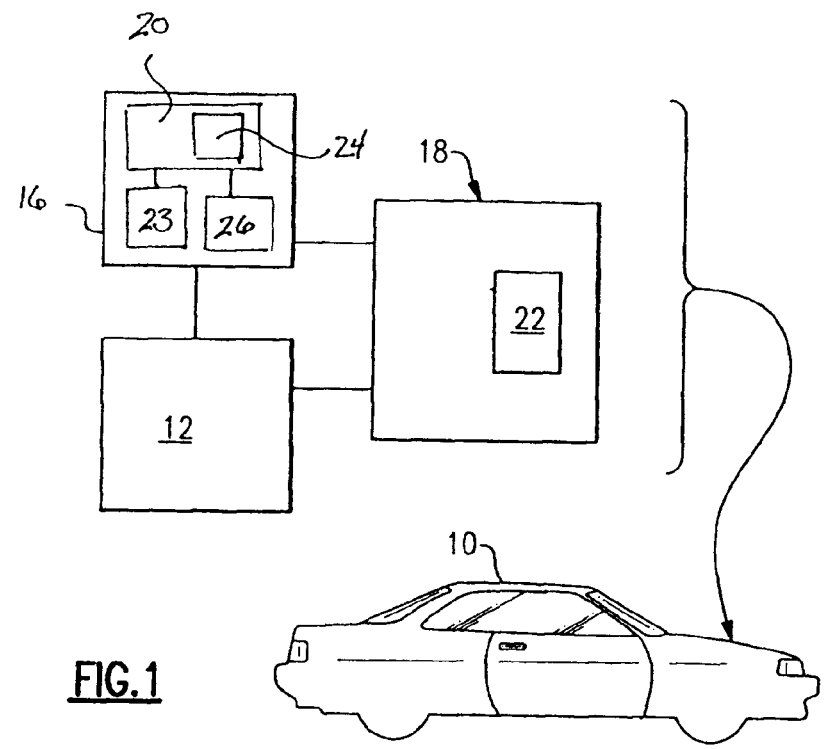
FIG. 1 is a schematic illustration of an example vehicle engine and intake manifold assembly using the sensor assembly of the present invention.

FIG. 1 illustrates a vehicle 10 having an engine 12 and an intake manifold system 16 connected to a fuel injection system 18. The intake manifold system 16 includes an engine actuator 20. An engine controller 22 within the fuel injection system 18 is connected to the engine actuator 20 to control the air delivery to the engine 12.

The engine controller 22 directs the engine actuator 20 to operate valves 23 within the intake manifold 16 to modify the combustion in engine 12. In order to provide the engine 12 with a proper timing for fuel ignition the intake engine controller 22 needs to know information, such as the manifold air pressure and engine actuator 20 position. As the engine 12 speed and temperatures increases airflow through the intake manifold 16 must be increased. When the speed and temperature of the engine 12 decrease airflow through the intake manifold 16 must be decreased. The engine actuator 20 adjusts valves inside the intake manifold 16 to optimize air delivery characteristics at different engine speeds by modifying air delivery parameters such as intake manifold tuning length or intake air tumble with. A sensor assembly 26 provides the engine actuator 20 with feedback regarding the position and speed of the valves 23 within the intake manifold 16.

Although the sensor assembly 26 is described as measuring the position of an engine actuator 20 the sensor assembly 26 may be used in other applications where determining the position of a device is required.

Figures 2, 3:
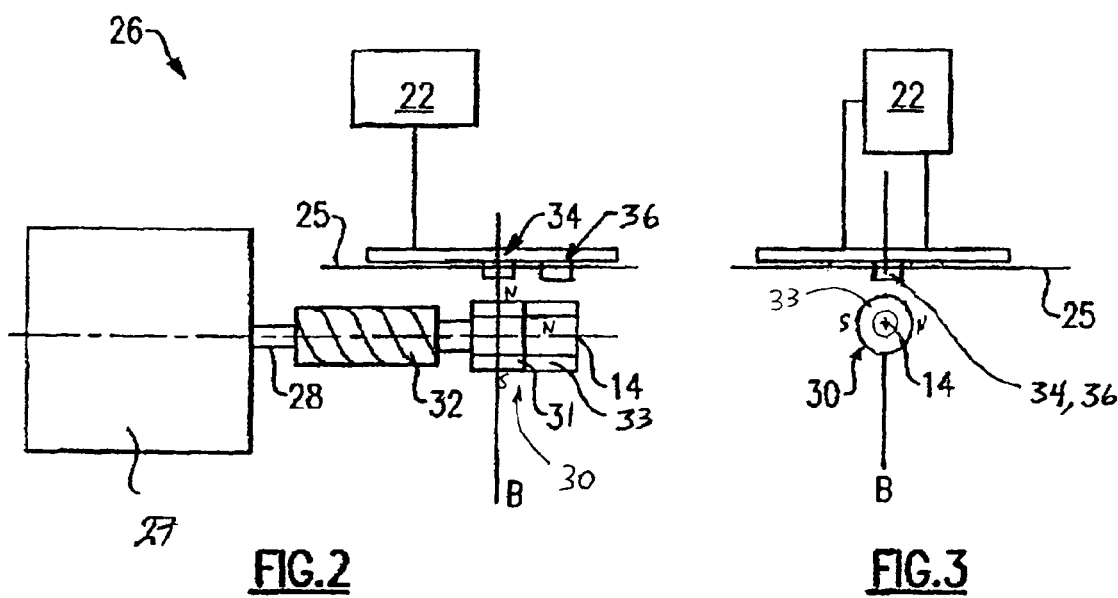
FIG. 2 is a schematic side view of an example sensor assembly of the present invention.
FIG. 3 is a schematic end view of the example sensor assembly of the present invention.

FIGS. 2 and 3 illustrate the sensor assembly 26 of the present invention. The sensor assembly 26 is connected to the engine actuator 20 by an electric motor 27. The electric motor adjusts the location of the valves 23 within the intake manifold 16 through a gear train (not shown) and has an output shaft 28. A magnet structure, generally indicated at 30, is mounted to the output shaft 28 and both the magnet structure 30 and output shaft 28 rotate about the same axis 14. In the example shown the magnet structure 30 includes a first bi-polar magnet 31 and a second, separate bi-polar magnet 33 arranged adjacent or stacked with respect to magnet 31. The magnets 31 and 33 are preferably ring shaped and arranged so that they are magnetized 90 degrees out of phase. The magnet structure 30 is mounted to a worm gear 32 that is mounted to the output shaft 28. Mounting the magnet structure 30 on the worm gear 32 provides an increased gear ratio over the output shaft 28 for better resolution by the sensor assembly 26. That is, as the output shaft 28 rotates the magnet structure 30 completes multiple rotations. In the example, the output shaft 28 rotates once for every one-hundred rotations of the worm gear 32, and thereby the magnet structure 30. The sensor assembly 26 is an increment sensor in that the number of magnet structure 30 rotations is counted by the sensor assembly 26 to determine the exact rotational position and speed of the output shaft 28. As an alternative to providing the separate magnets 31 and 33, four individual magnets polarized with alternating poles can be secured to a secondary holder (not shown) on the output shaft 28.

A first Hall effect sensor 34 is spaced from the first magnet 31 along an axis 25. By using a two-pole magnet 31, the axis 25 of the first Hall effect sensor 34 can be parallel to the output shaft 28 and still be perpendicular to the magnetic field B created by the magnet 31, as required for desired operation of the first Hall effect sensor 34. As the output shaft 28 rotates the first Hall effect sensor 34 senses the rotation of the magnet 31.

A second Hall effect sensor 36 is located near the first Hall effect sensor 34 along the axis 25 and is also parallel to the rotational axis 14 of the output shaft 28. The second Hall effect sensor 36 is associated with the magnet 33 to determine a position thereof. Thus, as the output shaft 28 rotates the second Hall effect sensor 36 senses the rotation of the magnet 33. The parallel mounting arrangement of sensor 36 saves space and cost for the sensor assembly 26.

As the magnet structure 30 rotates, polarity change per quadrant is determined and this information is collected by a microcontroller 24 in the engine actuator 20. The microcontroller 24 interprets the position information to control location of the valves 23 with increased accuracy and resolution. Position information is also sent to the engine controller 22. The engine controller 22 interprets the position information and controls fuel ignition 18.

Because the Hall effect sensors 34 and 36 are arranged parallel to the output shaft 28, less packaging room is required. Additionally, by using the two-pole magnets 31 and 33, an incremental sensor is provided saving both cost and space for the sensor assembly 26.

Although four magnet poles have been disclosed herein, a maximum number of poles on an output shaft is limited only by mechanical retention of a secondary magnet holder.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A position sensor assembly comprising:
    magnet structure having at least two dual pole magnets that are magnetized 90 degrees out of phase, the at least two dual pole magnets being mounted to a common output shaft for rotation, at the same rate, about a common axis of rotation; and
    at least one Hall effect sensor associated with each magnet to determined polarity change of the magnet structure per quadrant.

2. The assembly of claim 1, wherein the first and second magnets are arranged adjacently.

3. The assembly of claim 1, wherein each Hall effect sensor measures the incremental position of the associated magnet and thus a position of the output shaft.

4. The assembly of claim 1, wherein each Hall effect sensor is mounted parallel to the axis of rotation of the output shaft.

5. An engine actuator sensor assembly comprising:
    magnet structure having at least two dual pole magnets that are magnetized 90 degrees out of phase, the at least two dual pole magnets being mounted to a common output shaft for rotation, at the same rate, about a common axis of rotation; and
    at least one Hall effect sensor associated with each magnet to determined polarity change of the magnet structure per quadrant.

6. The assembly of claim 1, wherein the first and second magnets are arranged adjacently.

7. The assembly of claim 1, wherein each Hall effect sensor measures the incremental position of the associated magnet and thus a position of the output shaft.

8. The assembly of claim 1, wherein each Hall effect sensor is mounted parallel to the axis of rotation of the output shaft.

9. A method of measuring output shaft rotation for an engine actuator comprising:
    a) mounting a magnet structure, having at least two dual pole magnets that are magnetized 90 degrees out of phase, for rotation, at the same rate, about a common axis of rotation to a common output shaft;
    b) associating a Hall effect sensor with each magnet; and
    c) measuring an incremental position of the output shaft with the Hall effect sensors.

10. The assembly of claim 1, further comprising a worm gear mounted on the output shaft, the magnet structure being mounted to the worm gear so that with every one rotation of the output shaft, the worm gear and thus magnet structure completes multiple rotations.

11. The assembly of claim 5, further comprising a worm gear mounted on the output shaft, the magnet structure being mounted to the worm gear so that with every one rotation of the output shaft, the worm gear and thus magnet structure completes multiple rotations.

* * * * *